(12) United States Patent
Schoelkopf

(10) Patent No.: US 6,341,811 B1
(45) Date of Patent: Jan. 29, 2002

(54) MOTOR VEHICLE WINDOW WEATHER SHIELD

(76) Inventor: R. Edward Schoelkopf, P.O. Box 203, Waverly, VA (US) 23890-0203

(*) Notice: Subject to any disclaimer, the term of this patent is extended or adjusted under 35 U.S.C. 154(b) by 0 days.

(21) Appl. No.: 09/520,857

(22) Filed: Mar. 7, 2000

(51) Int. Cl.$^7$ ................................. B60J 1/20
(52) U.S. Cl. ........................ 296/154; 296/152
(58) Field of Search ................... 296/152, 154, 296/213, 99.1, 136, 163; 160/DIG. 4, 370.21; 135/88.07, 88.09

(56) References Cited

U.S. PATENT DOCUMENTS

| | | | | |
|---|---|---|---|---|
| 1,425,954 A | * | 8/1922 | Fischer | 160/370.21 |
| 1,551,108 A | * | 8/1925 | Lee | 160/370.21 |
| 2,741,195 A | * | 4/1956 | Hartzner | 296/163 X |
| 4,010,973 A | * | 3/1977 | Heinrich | 296/163 X |
| 4,160,458 A | * | 7/1979 | Marcellus | |
| 4,201,412 A | * | 5/1980 | Williams et al. | 296/163 |
| 4,426,111 A | * | 1/1984 | Smith | |
| 4,558,633 A | * | 12/1985 | Lingg | 296/152 X |
| 4,811,982 A | * | 3/1989 | Carlyle | 296/95.1 |
| 4,848,827 A | * | 7/1989 | Ou | 296/99.1 |
| 4,923,241 A | * | 5/1990 | Miller | 296/154 |
| D337,749 S | * | 7/1993 | Craighead et al. | |
| 5,415,214 A | * | 5/1995 | Bock et al. | |
| 5,460,425 A | * | 10/1995 | Stephens | 296/152 |
| 5,476,302 A | * | 12/1995 | Ronci | 296/99.1 |
| 6,019,414 A | * | 2/2000 | Pourciau, Sr. | 296/154 X |

* cited by examiner

*Primary Examiner*—Joseph D. Pape
(74) *Attorney, Agent, or Firm*—John Gugliotta

(57) ABSTRACT

A motor vehicle window weather shield is disclosed, comprised of a base and an awning. The awning is slidably engages the base and is designed to extend from the base, over a window on a motor vehicle. The awing may be locked into one of several positions relative to the base. The base is releasably secured to the hood of a motor vehicle via magnets.

8 Claims, 5 Drawing Sheets

MOTOR VEHICLE WINDOW WEATHER SHIELD

RELATED APPLICATIONS AND DISCLOSURES

The present invention was first disclosed in the Disclosure Document filed on Jun. 4, 1998. There have been no previously filed, nor any co-pending applications, anywhere in the world.

BACKGROUND OF THE INVENTION

1. Field of the Invention

The present invention relates generally to motor vehicle windows, and, more particularly, to a motor vehicle window weather shield.

2. Description of the Related Art

A common slogan used to refer to mailmen and newspaper carriers is that "neither rain, sleet, snow nor dark of night shall keep them from their appointed rounds." While this may be true, mailmen and newspaper carriers who deliver by motor vehicle are severely inconvenienced by bad weather.

Rain and snow cause problems for these individuals because they eventually soak the carrier. Also, the cold weather entering the automobile adds to his or her discomfort. Discomfort may also lead to decreased concentration, which can lead to accidents for the delivery person.

In addition, the condition of the delivered articles is affected by the rain and snow. The mail and newspapers may become damaged and/or unusable.

Beyond professional delivery personnel, most people have occasion to reach outside of their motor vehicle window, including during use of an ATM machine, using fast food drive through windows, etc. These individuals are affected by rain and snow during these procedures.

Accordingly, there is a need for a means by which individuals can reach outside of their motor vehicles in inclement weather without getting wet.

In the related art, several devices are disclosed that describe a car window awning with gutter water runoff. These include U.S. Pat. No. 5,460,425, issued in the name of Stephens, U.S. Pat. No. 4,923,241, issued in the name of Miller, U.S. Pat. No. 4,558,633, issued in the name of Lingg and U.S. Pat. No. 4,426,111, issued in the name of Smith.

U.S. Pat. No. 5,476,302, issued in the name of Ronci, discloses an awning for a car door when user opens it.

Several patents disclose window shields that prevent snow and ice buildup when a vehicle is not in use. These include U.S. Pat. No. 5,415,214, issued in the name of Bock et. al., U.S. Pat. No. 4,811,982, issued in the name of Carlyle, and U.S. Pat. No. D 337,749, issued in the name of Craighead et. al.

U.S. Pat. No. 4,160,458, issued in the name of Marcellus, describes an awning structure for a car door driven by electric motors that retracts and self-drains.

A search of the prior art did not disclose any patents that anticipate directly many features of the instant invention. Consequently, a need has been felt for providing an apparatus and method which overcomes the problems cited above.

SUMMARY OF THE INVENTION

It is therefore an object of the present invention to provide an improved motor vehicle window weather shield that enables a person to reach outside of the motor vehicle window while remaining dry.

Briefly described according to one embodiment of the present invention, a motor vehicle window weather shield is disclosed, comprising an add-on awning for the driver's side or passenger's side window of a motor vehicle.

The present invention consists of a base, which is releasably attached to the roof of the motor vehicle, above the window. Attachment is achieved via magnetic securing means. The base is designed to be sufficiently flexible to conform to and rest generally flush against most motor vehicle roofs of varying contours.

The awning portion of the present invention rides on a pair of rolling tracks, located on the base. As such, the awning portion can be extended outward from the base and consequently laterally outward from the side of the motor vehicle. This provides a shield from the elements for a person using the window located underneath the present invention. The awning portion may be locked in the extended position.

The awning portion has a contoured design that produces a water runoff away from the opened window.

The location of the awning above the window allows the present invention to be used with motor vehicles having windows of all sizes and configurations, as the awning portion does not have to match the exact size and configuration of the window.

With the awning portion extended from the base and locked in place, the carrier can deliver his or her parcels in an undamaged condition or a common person can simply reach outside of the motor vehicle window without having their person or car interior soaked with rain or snow.

It is envisioned that the present invention may be constructed of a material selected from the group comprising lightweight metal and plastic.

It is another object of the present invention to provide a device that shields a person who reaches outside of a motor vehicle, from the elements.

It is another object of the present invention to provide a device that prevents water damage to the interior of a motor vehicle when the window is open during rain or snow.

It is another object of the present invention to provide a device that is retractable, compact and portable.

| DESCRIPTIVE KEY | |
|---|---|
| 10 | motor vehicle window weather shield |
| 15 | window |
| 17 | motor vehicle |
| 20 | base |
| 30 | awning |
| 40 | roof |
| 50 | track |
| 60 | elongated side |
| 65 | attachment flange |
| 70 | hole |
| 80 | base securement means |
| 90 | magnet |
| 100 | anterior portion |
| 110 | roller |
| 120 | locking mechanism |
| 130 | spring loaded pin assembly |
| 131 | cable |
| 132 | handle |
| 133 | cable bearing |
| 134 | lever |
| 140 | pin |
| 150 | spring |

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
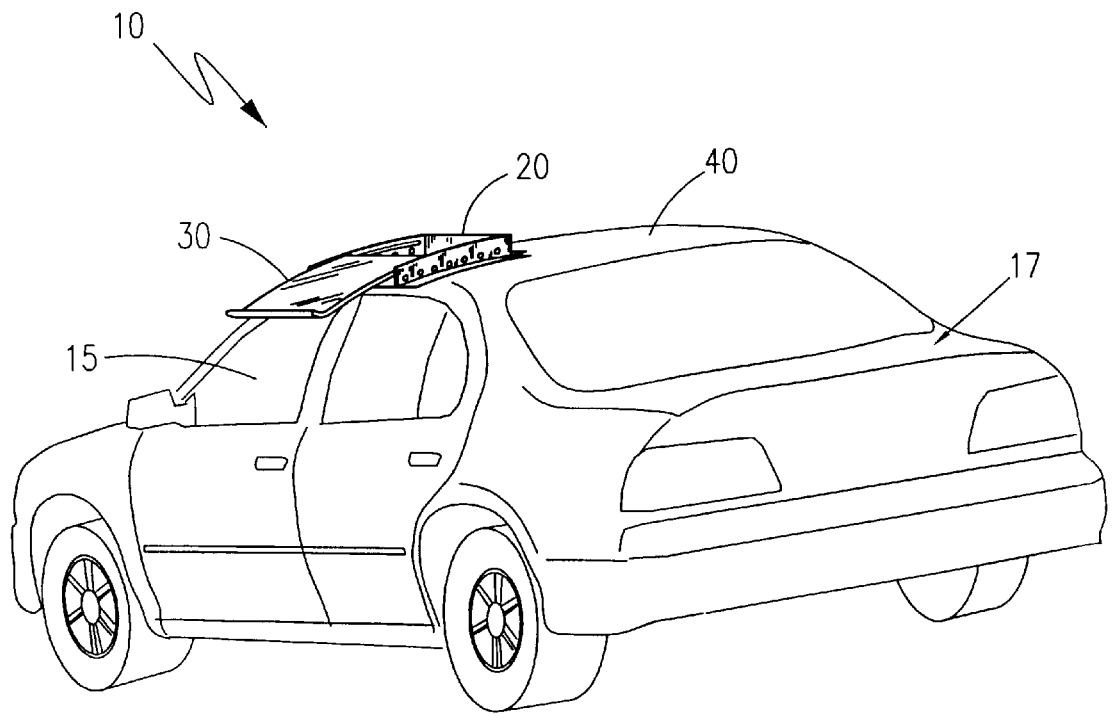
FIG. 1 is a perspective view of the preferred embodiment of motor vehicle window weather shield 10 shown in use with a motor vehicle.

The best mode for carrying out the invention is presented in terms of its preferred embodiment, herein depicted within the FIGS. 1 through 8.
1. Detailed Description of the Figures Referring now to FIG. 1, a motor vehicle window weather shield 10 is shown, according to the present invention, consisting of an add-on weather protection device for the driver's side or passenger's side window 15 of a motor vehicle 17.

The present invention is of a two piece construction, comprising a base 20 and an awning 30.

Referring now to FIGS. 1, the base 20 is releasably attached to the roof 40 of the motor vehicle 17, above the window 15. For purposes of disclosure, the base 20 is depicted as being of a generally rectangular, channel configuration and forming a series of flanges, urgable to a gentle arch shape such as to be capable of conforming to the contour of a vehicle's hood.

Figure 2:
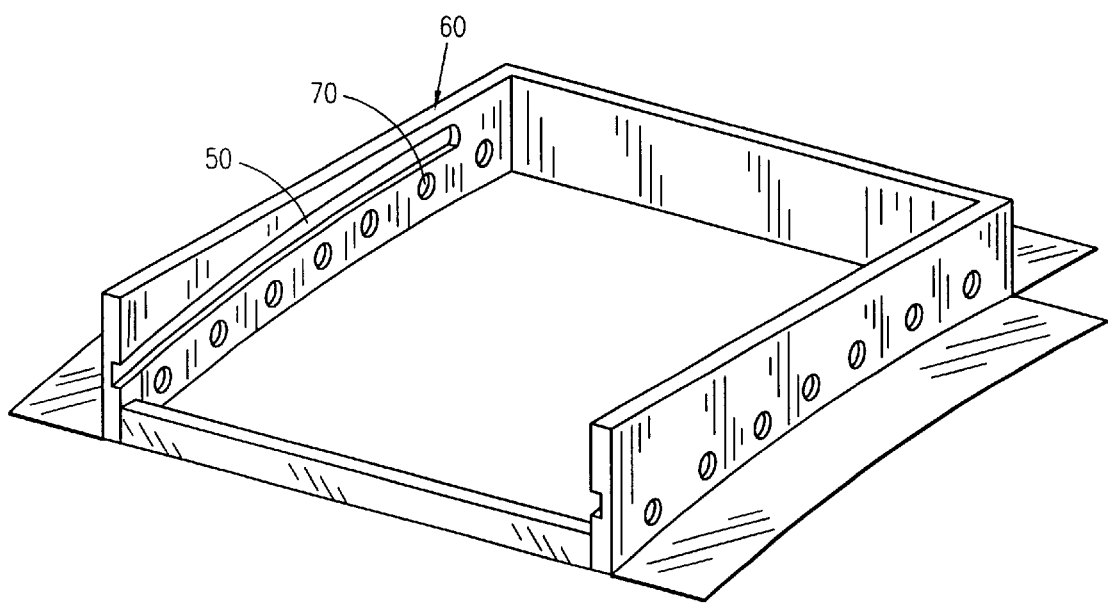
FIG. 2 is a perspective view of the base.
Figure 3:
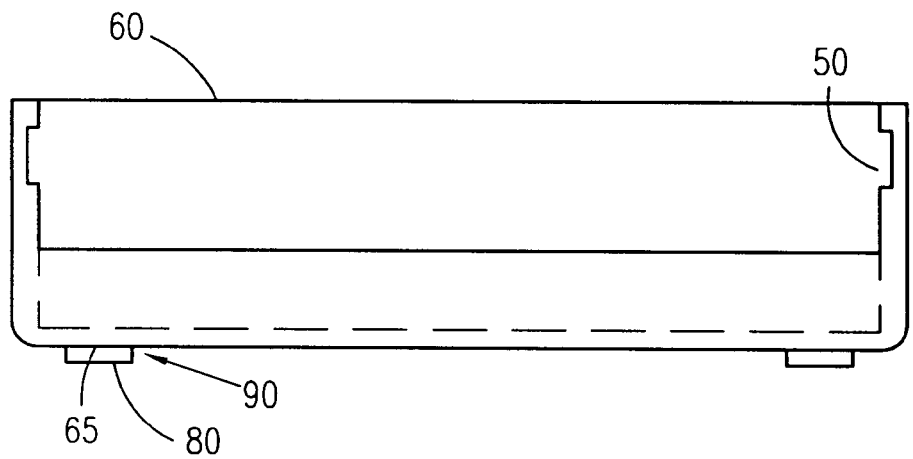
FIG. 3 is a front view of the base.

Referring now to FIGS. 2 and 3, a track 50 is located on the elongated sides 60 of the base 20. The track 50 is generally linearly elongated, and located inside of the elongated sides 60 of the base 20. An attachment flange 65 extends outward from the sides 60 in a lateral manner, and conform to the contour of the roof of the vehicle such that when attached to the vehicle in the manner described below a seal is formed to form a barrier to water and debris from penetrated beneath the base 20.

A series of holes 70 are located along each of the elongated sides 60 of the base 20. The elongated sides 60 of the base 20 are positioned perpendicular to the elongated centerline of the motor vehicle 17. The radial center lines of the holes 70 are parallel to the plane formed by the base 20. The holes 70 are positioned in pairs, with a hole 70 on each of a pair of elongated sides 60 being the same distance from each of a pair of shorter sides of the base 20 as a hole 70 on the other elongated side 60.

Figure 4:
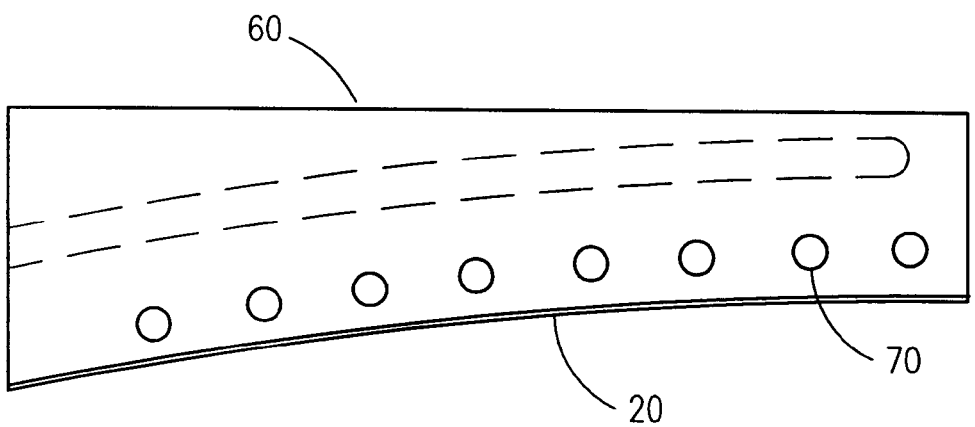
FIG. 4 is a side view of the base.

Referring now to FIG. 4, attachment of the base 20 to the hood of a motor vehicle 17 is achieved via base securement means 80. The base 20 may be designed to be sufficiently flexible to conform to and rest generally flush against most motor vehicle 17 roofs 40 of varying contours. To accommodate this, an attachment meant 80 affixed to the underside of the flanges 65 for attachment of the base 20 to the roof of a vehicle. Although many types of otherwise conventional attachment means can be utilized in accordance with the teachings of this present disclosure, for purposes of disclosing the known best mode it is felt that a series of flat, flexible magnets 90 affixed beneath the flanges 65 would allow for sufficient attachment, as well as aiding in the sealing of the flanges in a relatively weatherproof manner while still allowing for removability of the base 20 without damage to the vehicle.

It is envisioned that the base 20 may be permanently attached to the roof 40 of the motor vehicle 17 via pins, adhesives or other devices.

Figure 5:
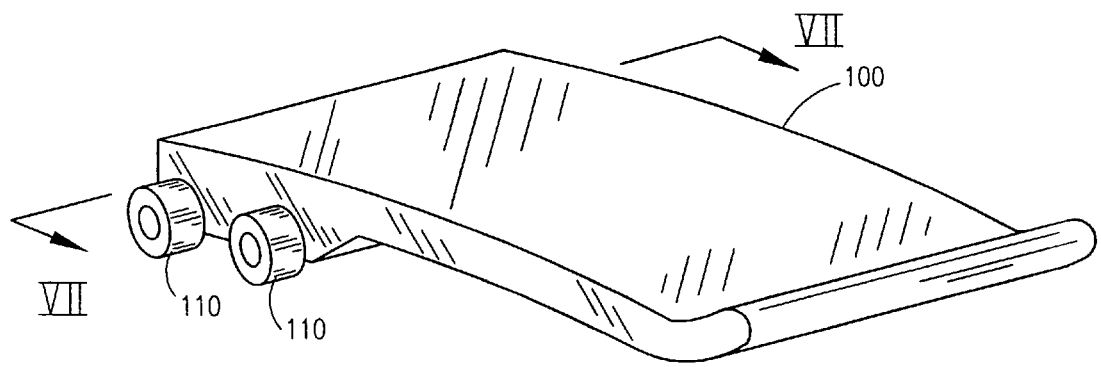
FIG. 5 is a top front view of the awning.
Figure 6:
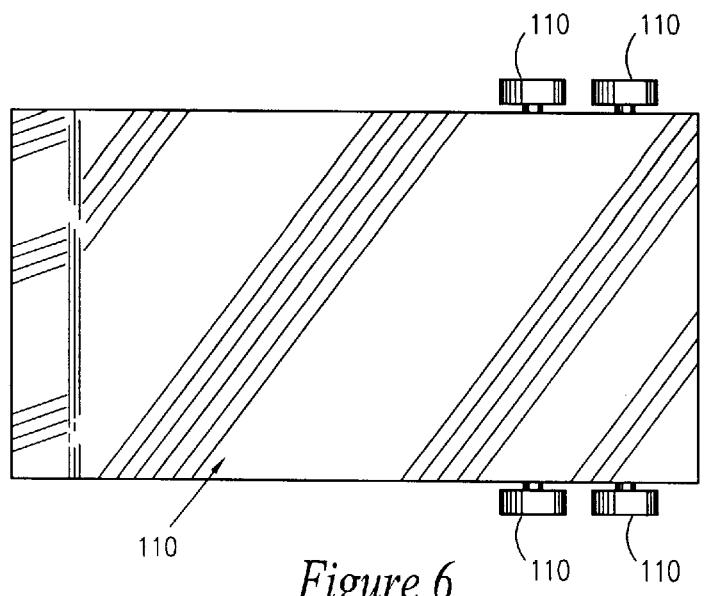
FIG. 6 is a side view of the preferred embodiment (closed)

Referring now to FIGS. 1, 5 and 6, the awning 30 of the present invention is of a generally rectangular configuration. The awning 30 is contoured so as to produce a water runoff away from the opened motor vehicle 17 window 15. For purposes of disclosure, the anterior portion 100 of the awning 30, which is located closest to the window 15 when the present invention is positioned on the roof 40 of the motor vehicle 17, is curved upward, to prevent water runoff over the window 15.

Referring now to FIGS. 2, 5 and 6, at least one roller 110 (not shown in FIG. 2) is located on each elongated side of the awning 30. The rollers 110 slidably engage inside of the tracks 50 present on the elongated side 60 of the base 20. The tracks 50 are designed so as to keep the base 20 in contact with the awning 30 at all times.

The rollers 110 on the awning 30 are designed to slidably engage and to stay inside of the tracks 50 on the base 20. As such, the awning 30 can be extended outward from the base 20 and consequently laterally outward from the side of the motor vehicle 17. This provides a shield from the elements for a person using the window 15 located underneath the present invention.

Figure 7:
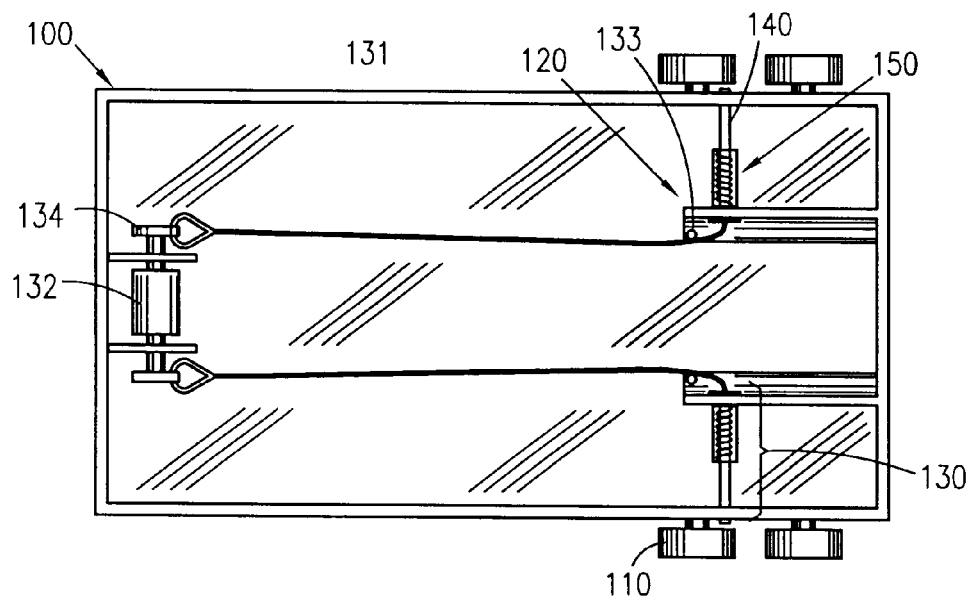
FIG. 7 is a cross sectional view taken on line VII—VII of FIG. 5.

Referring now to FIG. 7, a locking mechanism 120 is used to releasably secure the awning 30 in a variety of coverage positions relative to the window 15 of the motor vehicle 17. For purposes of disclosure, the locking mechanism 120 is depicted as set of two spring loaded pin assemblies 130 connected by a cable or other means 131 to a rotatable handle 132 via a cable bearing 133 and lever 134.

The handle 132 is located on said anterior bottom of the awning 30 and rotates along its elongated centerline. The cable 131 attached to each end of the handle 132 runs to the posterior portion of the awning 30, around the cable bearing 133, and connects to the spring loaded pin assembly 130. Two levers 134, one lever 134 attached to each end of the handle 132, facilitates connection between each cable 131 and the handle 132.

It is envisioned that the locking mechanism 120 can be operated with one hand. The pins 140 of the spring loaded pin assembly 130 are of a generally linearly elongated cylindrical configuration, and are located on the bottom anterior portion 100 of the awning 30. The pins 140 are spring 150 tensioned so as to extend outward laterally from the awning 30 when in the resting position, and capable of retraction via rotating the handle 132. Rotating the handle 160 retracts the pins 140.

The pins 140 are designed for insertion into the respective holes 70 located on the elongated sides 60 of the base 20. This configuration allows the user to lock the awning 30 in any of a variety of positions relative to the base 20.

With the awning 30 extended from the base 20 and locked in place, the carrier can deliver his or her parcels in an undamaged condition or a common person can simply reach outside of the motor vehicle 17 window 15 without having their person or car interior soaked with rain or snow.

It is envisioned that other methods of slidably securing the awing to the base 20 can be used. For example, various roller 110 configurations are envisioned.

Figure 8:
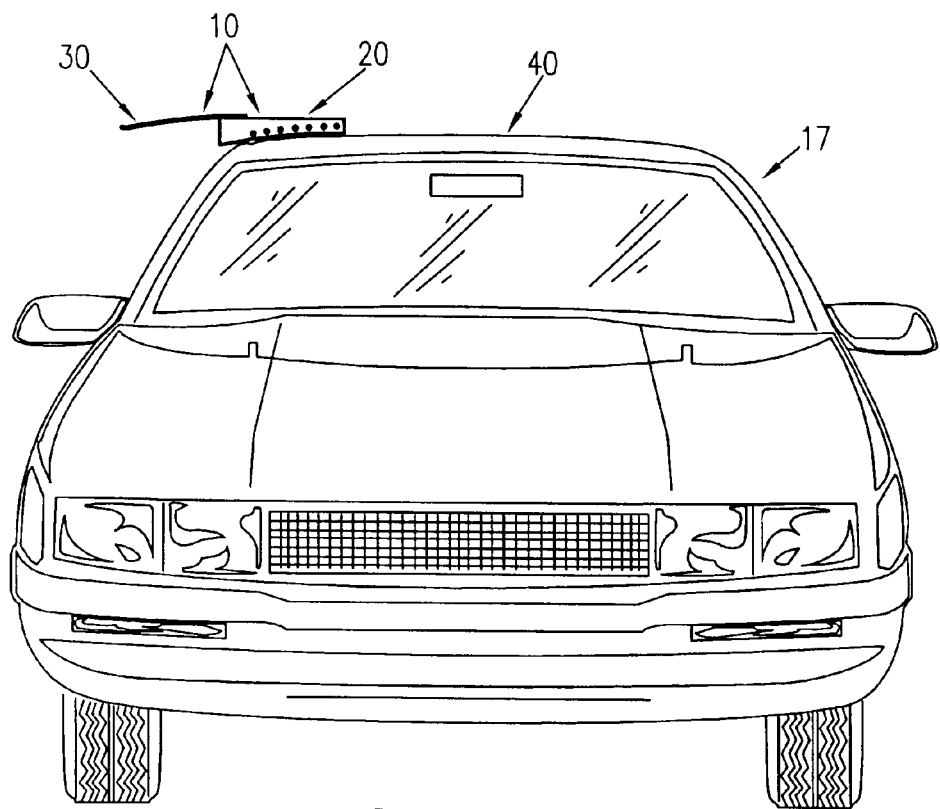
FIG. 8 is a front end elevational view of the present invention shown in use.

Referring now to FIG. 8, the location of the awning 30 above the window 15 of the motor vehicle 17 allows the present invention to be used with motor vehicle 17 having windows 15 of all sizes and configurations, as the awning 30 does not have to match the exact size and configuration of the window 15.

It is envisioned that other styles and configurations of the base 20, awning 30, base securement means 80, locking mechanism 120 and awning 30 attachment means can be easily incorporated into the teachings of the present invention, and only one particular configuration shall be shown and described for purposes of clarity and disclosure and not by way of limitation of scope.

2. Operation of the Preferred Embodiment

To use the present invention, the operator places the device on the roof 40 of the motor vehicle 17 to be used, so that as the awning 30 extends from the base 20, outward laterally from the motor vehicle 17, over the window 15 to be protected. When the awning 30 is desired for use, such as during inclement weather, the operator rotates the handle 132 on the bottom of the awning 30, releasing the pins 140 from the holes 70 on the elongated sides 60 of the base 20. The awning 30 is then extended from the base 20 until the awning 30 is in the desired position relative to the motor vehicle 17 window 15. The handle 132 is then released and the pins 140 allowed to slide into the closest holes 70 on the elongated sides 60 of the base 20. This may require some slight back and forth movement of the awning 30.

When the awning 30 is not longer needed, the springs are compressed, removing the pins from the holes 70, and the awning 30 is retracted onto the base 20. The springs are released and the pins located in the closest holes 70.

The entire device may be removed from the roof 40 of the motor vehicle 17 if desired, using a forceful lifting motion.

The foregoing description is included to illustrate the operation of the preferred embodiment and is not meant to limit the scope of the invention. The scope of the invention is to be limited only by the following claims.

What is claimed is:

1. A motor vehicle window weather shield comprising:

a base, said base being of a generally rectangular, channel configuration, and designed for releasable attachment to the roof of a motor vehicle, above the window, and said base having a pair of elongated sides and a pair of short sides:

a set of tracks, wherein each track of said set of tracks being located on the elongated sides of said base, said track being generally linearly elongated, and located inside of said elongated sides of said base;

a series of holes, said series of holes located along each of said elongated sides of said base;

base securement means, said base securement means used to releasably secure said base to said roof of said motor vehicle;

an awning, said awning being of a generally rectangular configuration, and contoured to produce a water runoff away from said opened motor vehicle window and said awning designed to be extended outward from said base;

at least one roller located on each side of said awning, said rollers rolling inside of said tracks present on said elongated side of said base; thereby keeping said awning attached to said base; and a locking mechanism, said locking mechanism used to releasably secure said awning in a variety of coverage positions relative to said base and consequently said window of said motor vehicle.

2. The motor vehicle window weather shield described in claim 1, wherein said base is designed to be sufficiently flexible to conform to and rest generally flush against most motor vehicle roofs of varying contours.

3. The motor vehicle window weather shield described in claim 1, wherein said base securement means is a series of magnets located along the bottom surface of said base, flush with the bottom of said base, and positioned so as to releasably secure said base to said metal roof of said motor vehicle via magnetic attraction.

4. The motor vehicle window weather shield described in claim 1, wherein the anterior portion of said awning, which is located closest to said window when said motor vehicle window weather shield is positioned on said roof of said motor vehicle, is curved upward, to prevent water runoff over said window.

5. The motor vehicle window weather shield described in claim 1, wherein said locking mechanism further comprises:

two spring loaded pins located on said bottom posterior portion of said awning, said pins being tensioned so as to extend outward laterally from said awning when in the resting position;

a handle, said handle located on said anterior bottom of said awning, and used to retract said pins, said handle capable of rotation along its radial centerline;

two cables, one said cable attached to each end of said handle, and running to their respective lateral, posterior portion of said awning, around a cable bearing, and connecting to said spring loaded pin; and a plurality of levers, one said lever attached to each end of said handle, and used to facilitate connection between each cable and said handle.

6. The motor vehicle window weather shield of claim 5, wherein said pins are designed for insertion into said respective holes located on said elongated sides of said base.

7. The motor vehicle window weather shield described in claim 1, wherein said locking mechanism can be operated with one hand.

8. The motor vehicle window weather shield described in claim 1, wherein said holes act as drainage means for water.

* * * * *